(12) United States Patent
Steinmann

(10) Patent No.: US 7,904,491 B2
(45) Date of Patent: Mar. 8, 2011

(54) DATA MAPPING AND IMPORT SYSTEM

(75) Inventor: Joerg Steinmann, Voelklingen (DE)

(73) Assignee: SAP AG, Walldorf (DE)

( * ) Notice: Subject to any disclaimer, the term of this patent is extended or adjusted under 35 U.S.C. 154(b) by 206 days.

(21) Appl. No.: 11/779,717

(22) Filed: Jul. 18, 2007

(65) Prior Publication Data

US 2009/0024639 A1   Jan. 22, 2009

(51) Int. Cl.
*G06F 17/30* (2006.01)

(52) U.S. Cl. .................... 707/809; 707/796; 707/804

(58) Field of Classification Search .......... 707/100–102, 707/104.1, 10, 103 R
See application file for complete search history.

(56) References Cited

U.S. PATENT DOCUMENTS

| | | | | |
|---|---|---|---|---|
| 5,893,913 A * | 4/1999 | Brodsky et al. | ............... | 707/201 |
| 6,154,748 A * | 11/2000 | Gupta et al. | .................. | 707/102 |
| 7,143,076 B2 * | 11/2006 | Weinberg et al. | ...................... | 1/1 |
| 7,313,569 B2 * | 12/2007 | Steinmann et al. | ........... | 707/102 |
| 7,574,516 B2 * | 8/2009 | Srinivasan et al. | ............ | 709/232 |
| 7,596,573 B2 * | 9/2009 | O'Neil et al. | ................. | 707/101 |
| 2002/0143521 A1 | 10/2002 | Call | | |
| 2002/0194196 A1 * | 12/2002 | Weinberg et al. | .......... | 707/104.1 |
| 2004/0056075 A1 * | 3/2004 | Gheorghe | ...................... | 228/199 |
| 2004/0181753 A1 * | 9/2004 | Michaelides | ................. | 715/523 |
| 2005/0149536 A1 * | 7/2005 | Wildes et al. | ................. | 707/100 |
| 2006/0206502 A1 | 9/2006 | Gaurav et al. | | |
| 2006/0282447 A1 | 12/2006 | Hollebeek | | |
| 2007/0245013 A1 * | 10/2007 | Saraswathy et al. | .......... | 709/223 |
| 2009/0031206 A1 * | 1/2009 | Aureglia et al. | .............. | 715/217 |

* cited by examiner

*Primary Examiner* — Debbie Le
(74) *Attorney, Agent, or Firm* — Brake Hughes Bellermann LLP

(57) ABSTRACT

A computer-implemented method related to a data mapping and import system is disclosed. A source file including a plurality of data records may be received, each data record comprising a sequence of data segments associated with source data. A target data structure comprising a plurality of target fields to which to import the source data of the source file may be identified. A mapping format comprising associations between each of the data segments for the plurality of data records and a target field of the plurality of target fields. And the source data from each of the data segments of each of the plurality of data records may be imported into the target field associated with each data segment based on the mapping format.

19 Claims, 5 Drawing Sheets

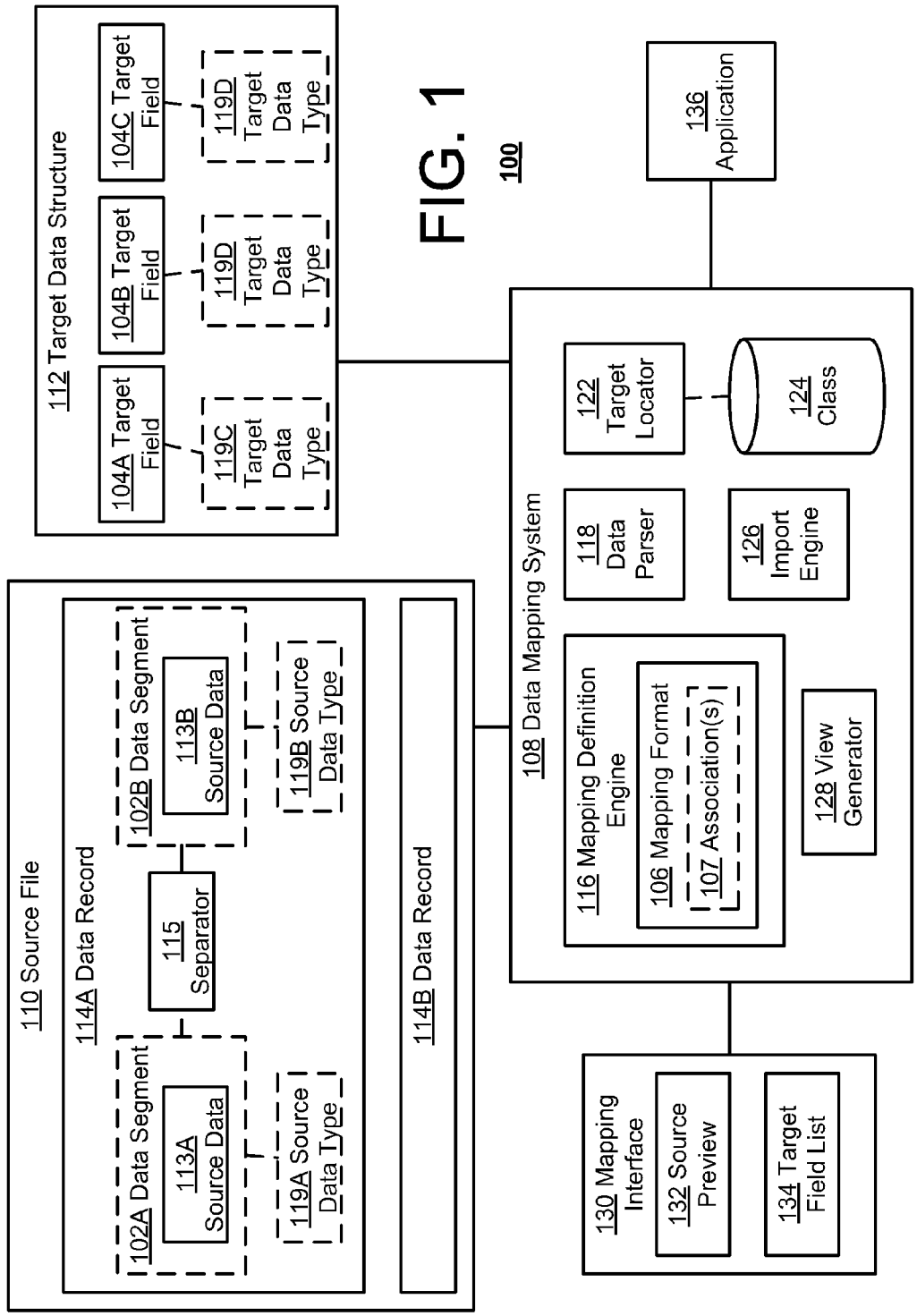

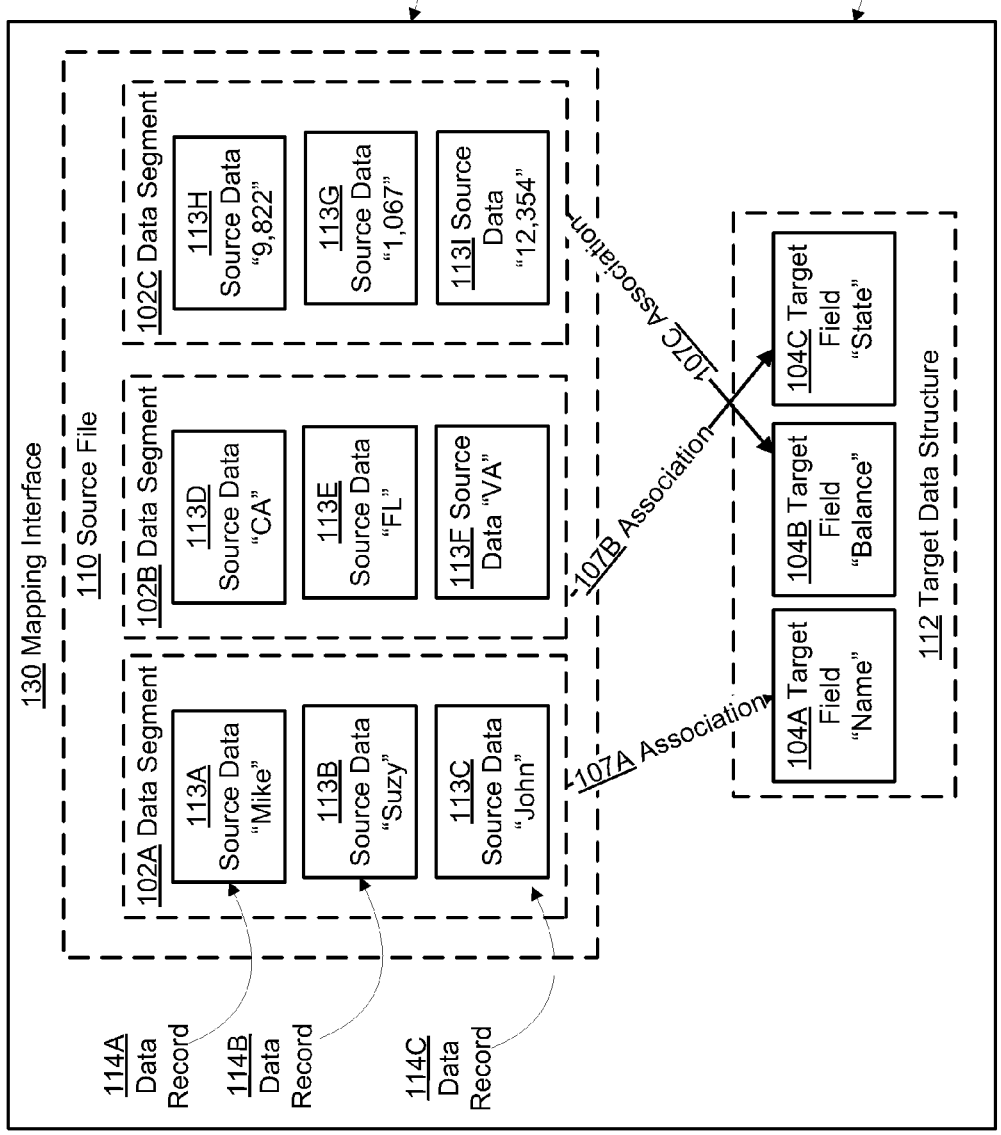

DATA MAPPING AND IMPORT SYSTEM

TECHNICAL FIELD

This description relates to the mapping and import of data.

BACKGROUND

In the business world, information may mean the difference between the success and failure of a business. The information may include customer and/or product information used by the business used to determine a marketing campaign or sales promotion. Often times, a business may pay another company to receive information about potential customers within one or more target demographics for such a marketing campaign. However, it may be the case that the information received from the company is in a format different from the format in which the business stores its data.

Unless the information received from the company is imported into the data structure by which the business stores its data, it may be difficult for the business to effectively and/or efficiently make use of the data. The business may prefer a way to quickly import the information, as received from one or more companies, into its own data structures such that the received information may be directly incorporated into its business plan or business model (e.g., marketing campaign). It may be the case that a business regularly receives data from one or more information providers. Then for example, the business may prefer that once a mapping format has been defined between a file structure associated with an information provider and the business's own data structures, that the business may reuse the mapping format when new or additional information is received from the information provider.

It may also be the case that even within a business, different parts of the business may need to communicate information with one another, however each part may store data or information in different data structures or formats. Thus, the business may prefer a way to expedite its own internal handling of data.

SUMMARY

According to an example embodiment a computer-implemented method is disclosed. A source file including a plurality of data records may be received, each data record comprising a sequence of data segments associated with source data. A target data structure comprising a plurality of target fields to which to import the source data of the source file may be identified. A mapping format comprising associations between each of the data segments for the plurality of data records and a target field of the plurality of target fields. And the source data from each of the data segments of each of the plurality of data records may be imported into the target field associated with each data segment based on the mapping format.

According to another example embodiment a method is disclosed. A selection of a source file including a plurality of data records may be received, each data record comprising a sequence of data segments associated with source data. One or more target data structures comprising a plurality of target fields to which to import the source data of the source file based on a mapping format associated with the source file may be identified. The source data of the source file may be imported into the target fields of the one or more target data structures based on the mapping format, the mapping format comprising, for each of the data segments for the plurality of data records, associations between each data segment and a target field of the plurality of target fields, wherein the source data of each data segment for each data record is imported into the target field associated with the data segment.

According to another example embodiment a system is disclosed. A data parser may be configured to determine a sequence of data segments associated with each of a plurality of data records of a source file based on an identification of a separator separating a first data segment from a second data segment, each data segment including source data. A target locator may be configured to identify one or more target data structures, including one or more target fields associated therewith, based on one or more classes associated with the one or more target data structures. A mapping definition engine may be configured to determine a mapping format including an association between each of the data segments of the sequence and one or more of the target fields. An import engine may be configured to import the source data from the source file to the target fields of the one or more data structures based on the mapping format.

The details of one or more implementations are set forth in the accompanying drawings and the description below. Other features will be apparent from the description and drawings, and from the claims.

BRIEF DESCRIPTION OF THE DRAWINGS

FIG. 1 is a block diagram of an example system 100 for a data mapping and import system, according to an example embodiment.

FIG. 2A is a block diagram of an example mapping interface of the system of FIG. 1, according to an example embodiment.

DETAILED DESCRIPTION

Figure 2B:
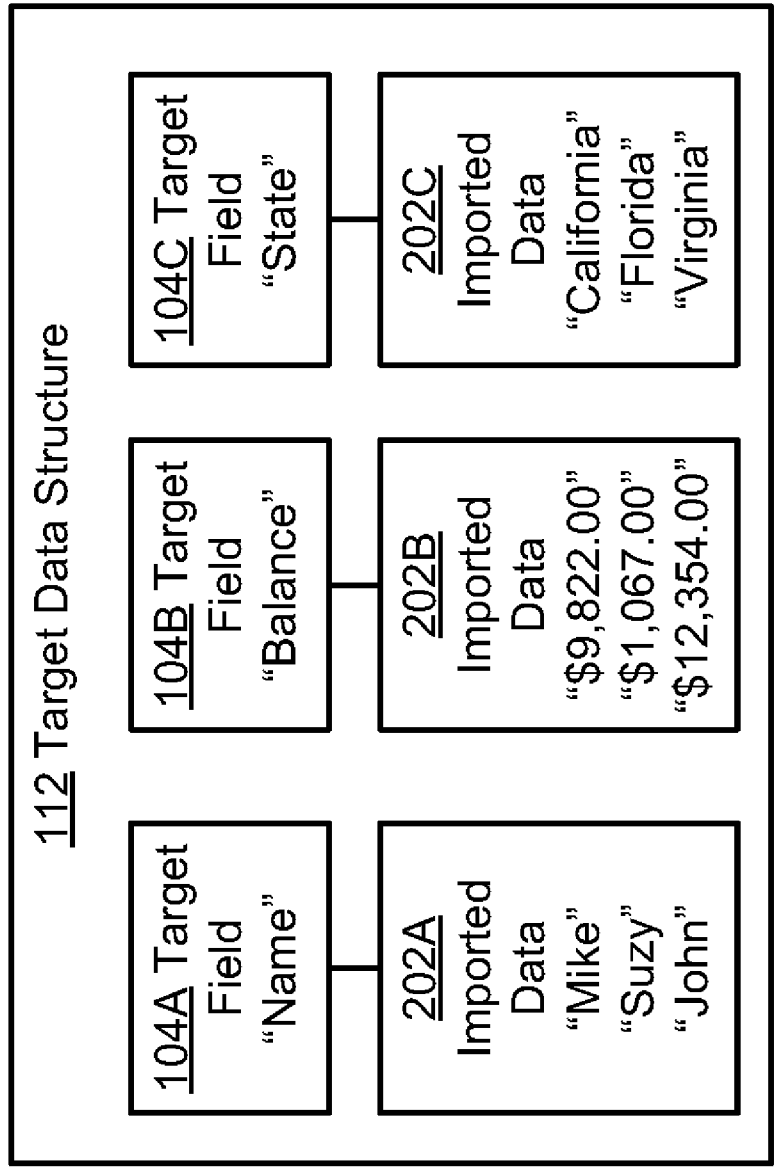
FIG. 2B is a block diagram of an example target data structure associated with the example mapping interface of FIG. 2A, according to an example embodiment.

FIG. 1 is a block diagram of an example system 100 for a data mapping and import system, according to an example embodiment. In the example of FIG. 1, the system 100 may determine or receive a mapping format (e.g., 106) that associates one or more data segments (e.g., 102A and 102B) with one or more target fields (e.g., 104A, 104B, 104C), whereby the data from the data segments may be imported into the target fields based on the mapping format.

The data segments 102A and 102B may include a grouping of similar data. For example, the data segments 102A and 102B may be associated with one or more columns from a spreadsheet file comprising multiple columns and multiple rows. Then for example, the data segments 102A and 102B may include data from one or more of the columns across one or more of the rows. According to an example embodiment, the data segment 102A may be associated with a customer name, whereby data in each row of the data segment 102A may include the name of a customer, and the data segment 102B may be associated with a customer age, whereby data each row of the data segment 102B may include the age of a corresponding customer (e.g., whose name may appear in the associated row in data segment 102A). In other example embodiments, the data segments 102A and 102B may correspond to one or more tables and/or fields of a database or other data storage structure.

The target fields 104A, 104B, and 104C may include one or more fields, tables or locations where data may be stored. For example, the target fields 104A, 104B, and 104C may include or otherwise correspond to columns from one or more database tables where the data from the data segments 102A and 102B may be imported. According to an example embodiment, the target fields 104A, 104B, and 104C may be configured or otherwise formatted to store or receive the data (from one or more of the data segments 102A and 102B) as determined based on a mapping format 106.

The mapping format 106 may include one or more relationships between the data segments 102A and 102B and one or more of the target fields 104A, 104B, and 104C. The mapping format 106 may include a map of which data from which data segments 102A and 102B is to be imported into which target fields 104A, 104B, and 104C. For example, as referenced above, the data segment 102A may include customer names, and the data segment 102B may include corresponding customer ages. Then for example, the mapping format 106 may include a first relationship or association 107 between the data segment 102A and the target field 104A and a second relationship or association 107 between the data segment 102B and the target field 104C, whereby the target fields 104A and 104C may be configured to store customer name and age information, respectively. The system 100 may allow the mapping format 106, after definition, to be stored, retrieved, reused and/or modified in future operations of the system 100.

The association(s) 107 may include relationship information associating one or more of the data segments 102A and 102B to one or more of the target fields 104A, 104B, and 104C. The association(s) 107 may be used to determine to which of the target fields 104A, 104B, and 104C to import the data from the data segments 102A and 102B. For example, as just discussed above, the association(s) 107 may include a first association between the data segment 102A and the target field 104A, and a second association between the data segment 102B and the target field 104C.

According to an example embodiment, the association(s) 107 may include processing to be performed prior to, during and/or after the importation of the data into the target fields 104A, 104B, and 104C. For example, the processing may include converting the data from the data segment 102A, which may include monetary values stored as Euros into the target field 104A, based on current currency conversion rates, wherein the target field 104A may be configured to store monetary values in US dollars. Or for example, the data segment 102B may include state names in various forms including "CA", "California", "Ca", "ca", and "Calif." whereby upon importation of data from the data segment 102B into the target field 104C the data may be processed and stored in one consistent, two-capital-letter abbreviation format such as "CA". In other example embodiments other kinds of processing may be performed.

A data mapping system 108 may be configured to determine the mapping format 106, including the association(s) 107, and import the data from the data segments 102A and 102B into the target fields 104A, 104B, and 104C based on the mapping format 106. The data mapping system 108 may be configured to identify and/or receive a source file 110, including the data segments 102A and 102B, and a target data structure 112, including the target fields 104A, 104B, and 104C. Then for example, the data mapping system 108 may import the data from the source file 110 into the target data structure 112 based on the mapping format 106.

As will be discussed in greater detail below, the data mapping system 108 may provide a separation of functionality associated with defining the mapping format 106 and importing data from the data segments 102A and 102B into the target fields 104A, 104B, and 104C. For example, the data mapping system 108 may dynamically determine the target fields 104A, 104B, and 104C based on a previously defined class (e.g., 124), wherein any updates to the target fields 104A, 104B, and 104C may be determined by the data mapping system 108 based on the class.

According to an example embodiment, the data mapping system 108 may include design-time functionality and/or run-time functionality. During the design-time functionality, as referenced above, the mapping format 106 may be defined wherein a determination may be made as to how data from the source file 110 is to be imported into the target data structure 112. Then for example, during the run-time functionality the data may actually be imported based on the mapping format 106. Such a separation of design-time functionality from run-time functionality may allow the data mapping system 108 to be more accommodating to changes to the source file 110 and/or the target data structure 112. For example, upon a modification to the target data structure 112, the separation of functionalities may allow a class 124 (as will be discussed in greater detail below) to be defined based on the modified target data structure 112 without changing the run-time functionality (as may be necessary were the design-time and run-time functionalities integrated and/or hard-coded).

The source file 110 may include any file including data. The source file 110 may include structured data. For example, the source file 110 may include data structured into a sequence of one or more data segments 102A and 102B, whereby data included in each data segment 102A and 102B may be associated or otherwise related to each other, as discussed above. The source file 110 may include, for example, a spreadsheet, database or other structured data file including data to be imported or otherwise loaded into the target data structure 112.

The target data structure 112 may include a memory structure, such as a spreadsheet or database, where data may be stored. For example, the target data structure 112 may include a database with a multiple tables, each table including multiple columns or fields, whereby at least a selection of the columns or fields may be provided as the target fields 104A, 104B, and 104C where the data from the source file 110 may be imported.

The source file 110, as discussed above, may include multiple data segments 102A and 102B, each data segment 102A and 102B may include or otherwise be associated with source data 113A, 113B, respectively. The source data 113A and 113B may include data any data associated with the corresponding data segment 102A and 102B. For example, if the data segment 102A corresponds to state names, the source data 113A may include data such as "Virginia," "CA", "Mich." and/or "tx." The source data 113A and 113B may include any data stored in the source file 110.

Within the source file 110, the data segments 102A and 102B may occur in a sequenced order, such as data segment 1, data segment 2, data segment 3, data segment 4, etc. Each sequence of data segments 102A and 102B (e.g., data segments 1-4) may comprise a data record 114A. Thus the source file 110 may include multiple data records 114A and 114B, each data record 114A and 114B corresponding to a sequence of data segments 102A and 102B. For example, if the source file 110 included data from a spreadsheet with multiple columns and rows. Then for example, the data segments 102A and 102B may correspond to the columns of the spreadsheet and the data records 114A and 114B may correspond to the rows of the spreadsheet. Data segments 102A and 102B of a data record 114A and 114B may include source data 113A and 113B that is associated with each other. For example, the source data 113A may include a customer name and the source data 113B may include a customer address. Then for example, the customer address (e.g., source data 113B) may be associated with the customer whose name appears in the source data 113A.

The data segments 102A and 102B and/or the source data 113A and 113B may be separated by a separator 115. The separator 115 may include a placeholder or divider used to separate or otherwise distinguish the source data 113A associated with the data segment 102A from the source data 113B associated with the data segment 102B. The separator 115 may include one or more designated characters used to separate data. For example, the separator 115 may include a "*", "-", "|", "--", or a space " ".

A mapping definition engine 116 may determine, receive, or otherwise define the mapping format 106. The mapping definition engine 116 may, for example, define the mapping format 106 based on the association(s) 107 as determined by or otherwise received from a user. In another example embodiment, the mapping definition engine 116 may retrieve or otherwise provide one or more previously defined mapping formats 106 to be used with the source file 110.

A data parser 118 may parse the source file 110 to determine the data segments 102A and 102B and/or the source data 113A and 113B. The data parser 118 may, for example, parse the data of the source file 110 for the separator 1115. Then for example, the data parser 118 may determine that the data prior to the separator 115 comprises the source data 113A of data segment 102A and the data after the separator 115 comprises the source data 113B of data segment 102B. According to another example embodiment, the data records 114A and 114B may be separated by the same separator 115 as used to separate the source data 113A and 113B, or may be separated by a second unique separator (not shown).

The data parser 118, according to other example embodiments, may be configured to determine a data type (e.g., 119A, 119B, 119C, 119D, and 119E) associated with data segments 102A and 102B and/or the target fields 104A, 104B, and 104C. The source data types 119A and 119B may include classes of values or other format information associated with the source data 113A and 113B of the associated data segments 102A and 102B. Similarly, the target data types 119C, 119D, and 119E may include format information associated with the type of data the respective target field(s) 104A, 104B, and 104C is configured to store and/or receive. Then for example, the mapping format 106 may include association(s) 107 between the data segments 102A and 102B and the target fields 104A, 104B, and 104C whereby the source data types 119A and 119B correspond to the target data types 119C, 119D, and 119E. According to another example embodiment the data parser 118 may copy the source data 113A and 113B into an internal format, such as a string format. Then for example, the data parser 118 may determine whether the copied source data 113A and 113B may be imported or copied into the selected target fields 104A, 104B and 104C based on a comparison of data types.

A target locator 122 may identify, locate or otherwise determine one or more target data structures 112 to which to import data. For example, the mapping format 106 may be associated with the target data structure 112. Then for example, the target locator 122 may identify the target data structure 112 based on the previously defined mapping format 106. According to another example embodiment, the target locator 122 may locate or identify the target data structure 112 based on one or more classes 124.

The class 124 may provide a construct, framework or other functionality interface by which the data mapping system 108 may locate, determine and/or otherwise interact with the target data structure 112, including the target fields 104A, 104B, and 104C. For example, the class 124 may represent a database table (e.g., target data structure 112) whereby previously defined methods of the class may be used to determine which target fields 104A, 104B, and 104C exist, determine the target data types 119C-E, and read data from and/or write data to the target fields 104A, 104B, and 104C. In other example embodiments, the class 124 methods may include additional and/or different functionality. Then for example, the target locator 122 may determine, from whichever classes 124 exist, which available target data structures 112 there are, including which target fields 104A, 104B, and 104C are available. According to another example embodiment, the mapping format 106 may be associated with one or more classes 124 which may be associated with one or more target data structures 112.

As was discussed above, the class(es) 124 may allow for a separation of the functionality of the data mapping system 108 from whichever target data structures 112 may exist. This may allow, for example, additional target data structures 112 to be added to the system 100 by defining additional classes 124 associated with the additional target data structures 112 rather than changing any coding associated with processing and/or importing the data (e.g., run-time functionality) from the source file 110 into the target data structure 112. Similarly, existing target data structures 112 may be modified and/or removed by modifying and/or removing the classes 124 and without disrupting the performance of the data mapping system 108.

The class 124 may allow the data mapping system 108 to dynamically determine the target data structure 112 based on the class 124, wherein any modifications to the target data structure 112 may be reflected by updating the class 124. Usage of the class 124 may allow for an improvement over other models of the system 100 wherein attributes of the target data structure 112 and integrated or hard-coded into the functionality of the data mapping system 108. By separating attributes of the target data structure 112 into the class 124 (rather than integrating or hard-coding the attributes), the data mapping system 108 may become more adaptable to changing business conditions and/or modifications to the target data structure 112. For example, the separation of the target data structure 112 attributes into the class 124 may allow a previously defined mapping format 106 to be used without modification to import data into a modified target data structure 112, wherein the class 124 associated with the target data structure 112 was updated based on the modification(s).

Such a separation of the mapping definition process and importation process may allow the system 100 to be more easily maintained and enhanced in accordance with varying business conditions by minimizing the likelihood of unintentionally changing the functionality of the system 100. For example, a business using the target data structure 112 to store its data, may over time, change the structure of how the data is stored (e.g., add tables, remove tables, rename tables, change database schematics, etc.). Then for example, any changes made to the target data structure 112 may be determined by the data mapping system 108 based on the class(es) 124.

An import engine 126 may import the source data 113A and 113B from the source file 110 into one or more of the target fields 104A, 104B, and 104C of the target data structure 112 based on the mapping format 106. The import engine 126 may, for example, retrieve the source data 113A and 113B, perform processing, if necessary (as discussed above, that may be determined based on the association(s) 107), on the source data 113A and 113B, and provide the processed source data 113A and 113B into the target fields 104A, 104B, and 104C using the class 124. According to an example embodiment, during a design-time functionality of the system 100, the import engine 126 may be used only to determine at least a portion of the source data 113A and 113B from the source file 110 to preview (e.g., in a source preview 132 as discussed below). In other example embodiments however, the import engine 126 may be used to both preview the source file 110 and import the source data 113A and 113B into the target data structure 112 based on the mapping format 106.

A view generator 128 may generate an interface or view associated with the data mapping system 108. For example, the view generator 128 may generate a mapping interface 130 by which a user may determine the associations of the mapping format 106.

The mapping interface 130 may include a graphical user interface by which the association(s) 107 of the mapping format 106 may be determined. For example, the mapping interface 130 may include a source preview 132 and a target field list 134 by which a user may graphically or visually determine and/or review the association(s) 107 between the source data 113A and 113B and the target fields 104A, 104B, and 104C.

The source preview 132 may include at least a portion of the data (e.g., the source data 113A and 113B) from the source file 110 as determined by the data parser 118. For example, the first data record 114A may include "John Smith*34*VA" and the second data record 114B may include "Kathy Williams*21*CA", wherein the separator 115 is the "*". Then for example, the source preview 132 may include "John Smith 34 VA" in a first row and "Kathy Williams 21 CA" in a second row.

The target field list 134 may include a preview, summary, description or other representation of the target fields 104A, 104B, and 104C. For example, the target field list 134 may include a visual representation of each box representing a target field 104A, 104B, and 104C, as determined by the target locator 122 based on the class 124. Then for example, in the mapping interface 130, a user may determine the association(s) 107 between the data segments 102A and 102B and the target fields 104A, 104B, and 104C based on the source preview 132 and target field list 134 as provided in the mapping interface 130. According to example embodiments, the association(s) 107 may be determined by constructing a line on the mapping interface 130 to represent an association 107, or the association(s) 107 may be determined via a drag-n-drop technology whereby data from the source preview 132 may be dragged and dropped into the associated target field 104A, 104B, and 104C in the target field list 134.

The association(s) 107, as determined via the mapping interface 130, may then be read by the mapping definition engine 116 which may produce the mapping format 106. According to an example embodiment, the mapping definition engine 116 may verify that associated data segments 102A and 102B and target fields 104A, 104B, and 104C including corresponding data types 119A, 119B, 119C, 119D, and 119E, as discussed above.

An application 136 may be used, according to an example embodiment, in association with the data mapping system 108. The application 136 may for example, perform additional data processing on the source data 113A and 113B of the source file 110 prior to importation into the target data structure 112. For example, the application 136 may verify or otherwise validate the source data 113A and 113B. For example, the application 136 may perform a postal check to verify that US zip codes provided in the source file 110 correspond to the proper cities and states associated with the zip codes. According to other example embodiments, application 136 may perform additional and/or different functionality with reference to the source data 113A and 113B. The data mapping system 108 may be integrated as part of, or otherwise be used in association with the application 136.

The data mapping system 108 may allow for the import of structured data from a source to a target. One or more mapping formats 106 may be used to determine both the structure of the source data 113A and 113B within the source file 110 and the structure of the target data structure 112 where the data is to be imported. The data mapping system 108 may dynamically determine any changes or modifications to the target data structure 112 based on one or more defined classes 124 associated with the target data structure 112, thus allowing for easier maintenance of the system 100. The mapping format 106 may include one or more association(s) 107 between the data segments 102A and 102B and the target fields 104A, 104B, and 104C. Then for example, using a defined mapping format 106, the system 100 may import and process the source data 113A and 113B from the source file 110 into the target data structure 112.

FIG. 2A is a block diagram of an example mapping interface 130 of the example system 100 of FIG. 1, according to an example embodiment. The source file 110 may include the data segments 102A, 102B, and 102C and the data records 114A, 114B, and 114C. The data record 114A may include for example, "Mike", "CA" and "9,822" whereby the data segment 102A includes "Mike", "Suzy" and "John".

The source preview 132 may include the source data 113A-I from the source file 110 as determined by based on separators (e.g., 115) separating the source data 113A, 113B, 113C, 113D, 113E, 113F, 113G, 113H, and 113I in the source file 110. The mapping interface 130 may provide the source preview 132 in association with the target field list 134.

The target field list 134 may include the target fields 104A, 104B, and 104C representing the target data structure 112. The target fields 104A, 104B, and 104C, as provided in the target field list 134 in the mapping interface 130 may include a representation, including a graphic and/or text, representing the target fields 104A, 104B, and 104C. For example, the target fields 104A, 104B, and 104C as provided in the mapping interface 130 may displayed as "Name", "Balance" and "State", respectively.

Then for example associations 107A, 107B, and 107C may be determined between the data segments 102A, 102B, and 102C and the target fields 104A, 104B, and 104C. For example, the data segment 102A may include customer names, including Mike, Suzy, and John. Then for example, the association 107A may be determined between the data segment 102A and the target field 104A. Similar associations (107B and 107C) may be determined with respect to the other data segments 102B and 102C.

FIG. 2B is a block diagram of an example target data structure 112 associated with the example mapping interface 130 of FIG. 2A, according to an example embodiment. Based on the associations 107A, 107B, and 107C of FIG. 2A, the source data 113A, 113B, 113C, 113D, 113E, 113F, 113G, 113H, and 113I may be imported into the target data structure 112 as shown in FIG. 2B.

The source data 113A, 113B, 113C, 113D, 113E, 113F, 113G, 113H, and 113I as imported into the target data structure 112 may appear as imported data 202A, 202B, and 202C within the target data structure 112. The imported data 202A, 202B, and 202C may include the source data 113A, 113B, 113C, 113D, 113E, 113F, 113G, 113H, and 113I, as imported into the target data structure 112, based on a mapping format (e.g., 106) and including the performance of processing as determined based on the associations 107A, 107B, and 107C. For example, the names 113A, 113B, and 113C may have been directly transferred into the target field 104A without any additional processing based on the association 107A, as may be seen in the imported data 202A.

The balance data 113G, 113H, and 113I may have been imported after the performance of formatting, including adding the "$" and 2 decimal spots, as may have been determined based on the association 107C. For example, the source data 113H "1,067" may have been imported as "$1,067.00" as may be seen in the imported data 202B.

The state data 113D, 113E, and 113F may have been imported after a conversion into the full state name, as may be determined based on the association 107B. For example, the source data 113D "CA" may be imported as "California" as may be seen in the imported data 202C.

Figure 3:
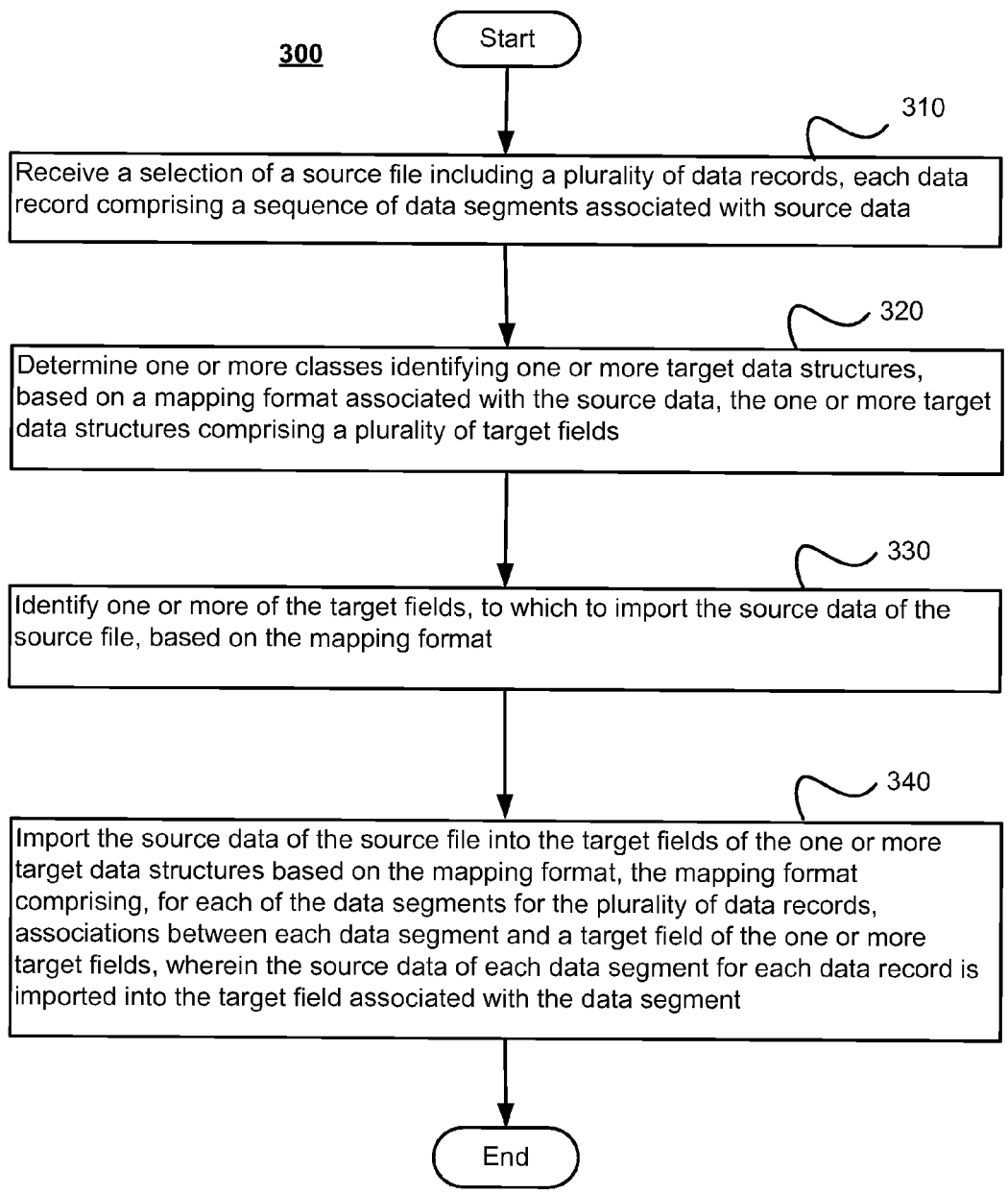
FIG. 3 is a flowchart illustrating example operations of the system of FIG. 1, according to an example embodiment.

FIG. 3 is a flowchart 300 illustrating example operations of the system of FIG. 1, according to an example embodiment. More specifically, FIG. 3 illustrates an operational flow 300 representing example operations related to a data mapping and import system.

After a start operation, a selection of a source file including a plurality of data records may be received, each data record comprising a sequence of data segments associated with source data (310). For example, as shown in FIG. 1, a selection of the source file 110 including the data records 114A and 114B may be received, the data record 114A including the data segments 102A and 102B associated with the source data 113A and 113B, respectively.

One or more classes identifying one or more target data structures may be determined based on a mapping format associated with the source data, the one or more target data structures comprising a plurality of target fields (320). For example, the class 124 identifying the target data structure 112 may be determined based on the mapping format 106 associated with the source file 110, including the source data 113A and 113B. Then for example, the target data structure 112 may comprise the target fields 104A, 104B and 104C.

One or more of the target fields, to which to import the source data of the source file may be identified based on the mapping format (330). For example, the target fields 104A, 104B, and 104C of the target data structure 112, to which to import the source data 113A and 113B of the source file 110 may be identified based on the mapping format 106 associated with the source file 110.

The source data of the source file may be imported into the target fields of the one or more target data structures based on the mapping format, the mapping format comprising, for each of the data segments for the plurality of data records, associations between each data segment and a target field of the one or more target fields, wherein the source data of each data segment for each data record is imported into the target field associated with the data segment (340). For example, as shown in FIG. 2B, the source data 113A, 113B, 113C, 113D, 113E, 113F, 113G, 113H, and 113I (of FIG. 2A) may be imported into the target fields 104A, 104B and 104C of the target data structure 112 based on the associations 107A, 107B, and 107C.

Figure 4:
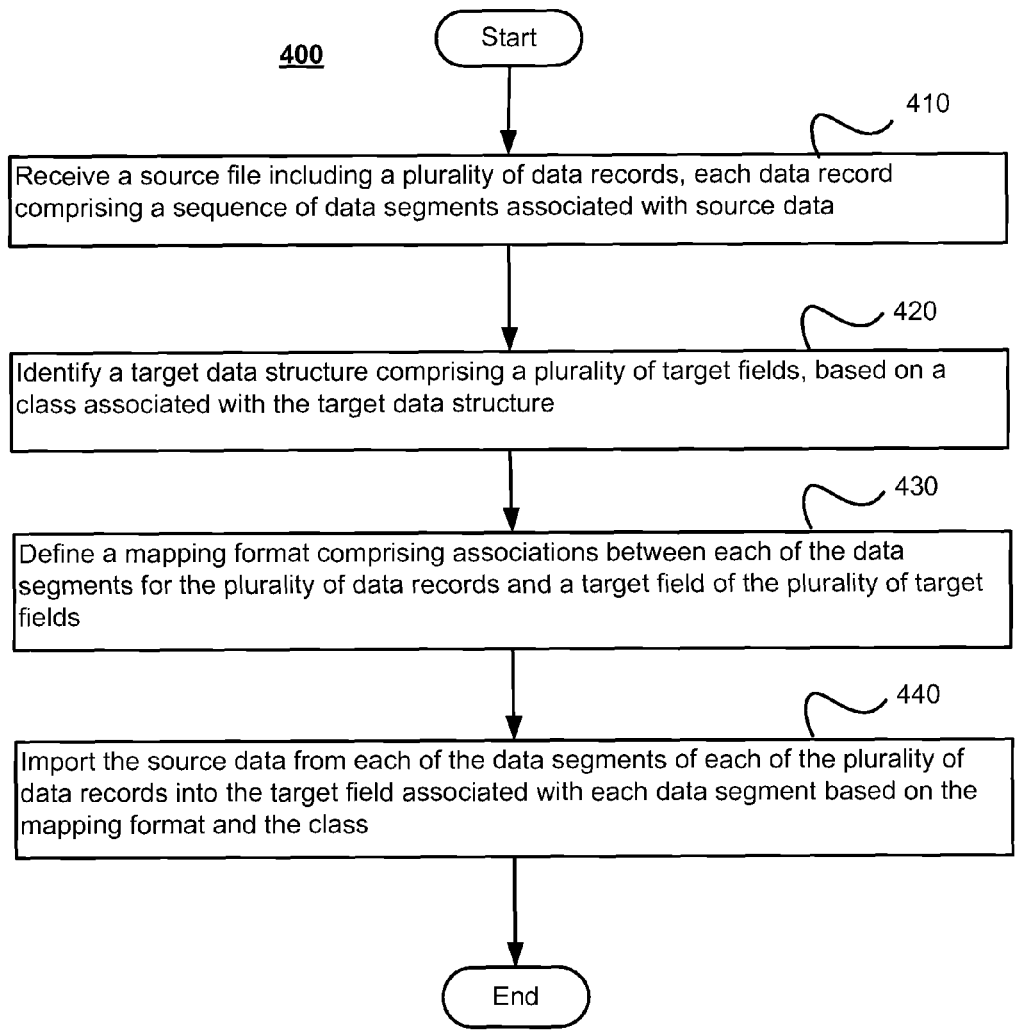
FIG. 4 is a flowchart illustrating example operations of the system of FIG. 1, according to an example embodiment.

FIG. 4 is a flowchart 400 illustrating example operations of the system of FIG. 1, according to an example embodiment. More specifically, FIG. 4 illustrates an operational flow 400 representing example operations related to a data mapping system.

After a start operation, a source file including a plurality of data records may be received, each data record comprising a sequence of data segments associated with source data (410). For example, as shown in FIG. 1, the source file 110, including the data records 14A and 14B may be received, the data record 14A including the data segments 102A and 102B associated with the source data 113A and 113B, respectively.

A target data structure comprising a plurality of target fields, based on a class associated with the target data structure may be identified (420). For example, the target data structure 112, including the target fields 104A, 104B, and 104C may be identified based on the class 124 associated with the target data structure 112.

A mapping format comprising associations between each of the data segments for the plurality of data records and a target field of the plurality of target fields may be defined (430). For example, the mapping format 106, including the association(s) 107 may be determined.

The source data from each of the data segments of each of the plurality of data records may be imported into the target field associated with each data segment based on the mapping format and the class (440). For example, as shown in FIG. 2B, the source data 113A, 113B, 113C, 113D, 113E, 113F, 113G, 113H, and 113I (of FIG. 2A) may be imported into the target data structure 112 based on the associations 107A, 107B, and 107C of the mapping format 106 and the class 124.

Although the above description is provided in terms of specific examples, it will be appreciated that many other examples and settings are contemplated. For example, the term business document should be interpreted broadly as including any document that is used in profit generation of some sort, although the business document 104 also may refer to documents for non-profit endeavors as well, including, for example, schools, churches, charities, hospitals, or virtually any other organization. Further, the business document 104 is merely an example, and other applications, such as applications for personal use, also may be used.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the true spirit of the embodiments.

What is claimed is:

1. A computer-implemented method comprising:
   receiving a source file including a plurality of data records, each data record comprising a sequence of data segments associated with source data;
   identifying a target data structure comprising a plurality of target fields, based on a class associated with the target data structure, wherein the class represents a database table and previously defined methods of the class are used to determine which target fields exist;
   defining a mapping format comprising associations between each of the data segments for the plurality of data records and a target field of the plurality of target fields;
   processing the source data from each of the data segments of each of the plurality of data records to validate the source data from each of the data segments of the data records; and
   importing the source data from each of the data segments of each of the plurality of data records into the target field associated with each data segment based on the mapping format and the class.

2. The method of claim 1 wherein the receiving a source file comprises determining the sequence of data segments based on an identification of a separator separating a first data segment from a second data segment.

3. The method of claim 1 wherein the receiving a source file comprises determining that the sequence of data segments is identical for each data record.

4. The method of claim 1 wherein the receiving a source file comprises receiving the sequence of data segments wherein each data segment corresponds to a data type.

5. The method of claim 4 wherein the association between a data segment and a target field is based on the data type.

6. The method of claim 1 wherein the identifying a target data structure comprises identifying the class, from one or more classes, wherein the class provides an interface to accessing the target data structure.

7. The method of claim 6 wherein the identifying comprises determining the plurality of target fields based on the class.

8. The method of claim 1 wherein the defining comprises:
   identifying the associations between each of the data segments for the plurality of data records and the plurality of target fields; and
   determining the mapping format based on the associations.

9. A method comprising:
   receiving a selection of a source file including a plurality of data records, each data record comprising a sequence of data segments associated with source data;
   determining, using a processor, one or more classes identifying one or more target data structures, based on a mapping format associated with the source data, the one or more target data structures comprising a plurality of target fields, wherein the class represents a database table and previously defined methods of the classes are used to determine which of the target fields exist;
   identifying, using the processor, one or more of the target fields, to which to import the source data of the source file, based on the mapping format;
   processing, using the processor, the source data of the source file to validate the source data of the source file; and
   importing, using the processor, the source data of the source file into the target fields of the one or more target data structures based on the mapping format, the mapping format comprising, for each of the data segments for the plurality of data records, associations between each data segment and a target field of the one or more target fields, wherein the source data of each data segment for each data record is imported into the target field associated with the data segment.

10. The method of claim 9 wherein the receiving comprises uploading the source data from the source file.

11. The method of claim 9 wherein the receiving comprises parsing the source data for one or more separators separating the data segments.

12. The method of claim 9 wherein the determining comprises receiving a selection of the mapping format from a plurality of mapping formats, wherein each mapping format is associated with one or more source files.

13. The method of claim 9 wherein the determining comprises determining the one or more classes, wherein the one or more classes are configured to provide an interface to accessing the target data structure.

14. The method of claim 13 wherein the determining comprises identifying the target fields of the one or more target data structures based on the one or more classes.

15. The method of claim 9 wherein the importing comprises:
- determining the associations between each of the data segments for the plurality of data records and the target fields; and
- importing the source data from each data segment for each record to the target fields based on the associations.

16. A system comprising:
- a data parser, executed by a processor, that is configured to determine a sequence of data segments associated with each of a plurality of data records of a source file based on an identification of a separator separating a first data segment from a second data segment, each data segment including source data;
- a target locator, executed by the processor, that is configured to identify one or more target data structures, including one or more target fields associated therewith, based on one or more classes associated with the one or more target data structures, wherein the class represents a database table and previously defined methods of the classes are used to determine which target fields exist;
- a mapping definition engine, executed by the processor, that is configured to determine a mapping format including an association between each of the data segments of the sequence and one or more of the target fields;
- a processing engine, executed by the processor, that is configured to validate the source data from the source file; and
- an import engine, executed by the processor, that is configured to import the source data from the source file to the target fields of the one or more data structures based on the mapping format.

17. The system of claim 16 further comprising value mapping logic, executed by the processor, that is configured to determine one or more data processing steps to be performed based on the associations between each of the data segments of the sequence and the target fields.

18. The system of claim 16 further comprising a view generator, executed by the processor, that is configured to provide an interface associated with determining the mapping format.

19. The system of claim 16 further comprising a class logic, executed by the processor, that is configured to determine an association between a class and a target data structure.

* * * * *